United States Patent
Seibel et al.

(10) Patent No.: US 6,982,533 B2
(45) Date of Patent: Jan. 3, 2006

(54) METHOD AND APPARATUS TO REGULATE LOADS

(75) Inventors: Brian J. Seibel, Grafton, WI (US); Russel J. Kerkman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/667,273

(22) Filed: Sep. 17, 2003

(65) Prior Publication Data

US 2005/0057208 A1 Mar. 17, 2005

(51) Int. Cl.
H02P 7/00 (2006.01)

(52) U.S. Cl. .............. 318/432; 318/434; 318/801; 318/700; 318/712

(58) Field of Classification Search ............ 318/432, 318/434, 801, 700, 712, 727, 802, 803
See application file for complete search history.

(56) References Cited

U.S. PATENT DOCUMENTS

| | | | | |
|---|---|---|---|---|
| 4,280,085 A | * | 7/1981 | Cutler et al. | 318/803 |
| 4,724,373 A | * | 2/1988 | Lipo | 318/805 |
| 5,272,429 A | * | 12/1993 | Lipo et al. | 318/808 |
| 5,510,689 A | * | 4/1996 | Lipo et al. | 318/809 |
| 5,717,305 A | * | 2/1998 | Seibel et al. | 318/778 |
| 5,811,957 A | * | 9/1998 | Bose et al. | 318/802 |
| 5,818,192 A | * | 10/1998 | Nozari | 318/609 |
| 5,973,474 A | * | 10/1999 | Yamamoto | 318/801 |
| 6,014,006 A | * | 1/2000 | Stuntz et al. | 318/804 |
| 6,069,467 A | * | 5/2000 | Jansen | 318/802 |
| 6,137,258 A | * | 10/2000 | Jansen | 318/802 |
| 6,335,605 B1 | * | 1/2002 | Negoro | 318/727 |
| 6,429,620 B2 | * | 8/2002 | Nakazawa | 318/701 |
| 6,433,506 B1 | * | 8/2002 | Pavlov et al. | 318/804 |
| 6,504,329 B2 | * | 1/2003 | Stancu et al. | 318/254 |
| 6,683,428 B2 | * | 1/2004 | Pavlov et al. | 318/432 |

* cited by examiner

Primary Examiner—Rita Leykin
(74) Attorney, Agent, or Firm—Quarles & Brady LLP; William R. Walbrun

(57) ABSTRACT

A method and apparatus for use with a controller for controlling a machine wherein a torque reference value is provided, the method for identifying an error representative of the difference between the torque reference value and the torque applied to the machine and using the error value to modify machine operation, the method comprising the steps of obtaining feedback current values corresponding to the currents provided to the machine, mathematically combining the feedback current values to generate an error value, mathematically combining the error value and the torque reference value to generate a torque command value and using the torque command value to control the machine.

20 Claims, 7 Drawing Sheets

US 6,982,533 B2

METHOD AND APPARATUS TO REGULATE LOADS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to controllers providing adjustable frequency currents to loads and more specifically, to a method and apparatus to regulate torque provided to loads.

Induction Motors

Induction motors have broad application in industry, particularly when large horsepower is needed. A three phase induction motor receives three phases of electrical voltage to produce a rotating magnetic stator field. A rotor contained within the stator field experiences an induced current (hence the term induction) which generates a rotor field. The interaction of the rotor field and the stator field causes rotation of the rotor.

A common rotor design is a "squirrel cage winding" in which axial conductive bars are connected at either end by shorting rings to form a generally cylindrical structure. The flux of the stator field cutting across the conductive bars induces cyclic current flows through the bars and across the shorting rings. The cyclic current flows in turn produce the rotor field.

The use of this induced current to generate the rotor field eliminates the need for slip rings or brushes to provide power to the rotor, making the design relatively maintenance free.

Field Oriented Control of Induction Machines

To a first approximation, the torque and speed of an induction motor may be controlled by changing the frequency of the driving voltage and thus the angular rate of the rotating stator field. Generally, for a given torque, increasing the stator field rate will increase the speed of the rotor (which follows the stator field). Alternatively, for a given rotor speed, increasing the frequency of the stator field will increase the torque by increasing the slip, that is the difference in speed between the rotor and the stator field. An increase in slip increases the rate at which flux lines are cut by the rotor, increasing the rotor generated field and thus the force or torque between the rotor and stator fields.

Referring to FIG. 1, the rotating phasor 1 of the stator magneto motive force ("mmf") will generally have some angle α with respect to the phasor of rotor flux 2. The torque generated by the motor will be proportional to the magnitudes of these phasors 1 and 2 but also will be a function of their angle α. The maximum torque is produced when phasors 1 and 2 form a right angle to each other (e.g., α=90°) whereas zero torque is produced if these phasors are aligned (e.g., α=0°). Phasor 1 may therefore be usefully decomposed into a torque producing component 3 perpendicular to phasor 2 and a flux component 4 parallel to rotor flux phasor 2.

These two components 3 and 4 of the stator mmf are proportional, respectively, to two stator currents $i_{qs}$, a torque producing current and $i_{ds}$, a flux producing current, which may be represented by orthogonal vectors in the rotating frame of reference (synchronous frame of reference) of the stator flux having slowly varying magnitudes. Accordingly, in controlling an induction motor, it is generally desired to control not only the frequency of the applied voltage (hence the speed of the rotation of the stator flux phasor 1) but also the phase of the applied voltage relative to the current flow and hence the division of the currents through the stator windings into the $i_{qs}$ and $i_{ds}$ components. Control strategies that attempt to independently control the currents $i_{qs}$ and $i_{ds}$ are generally termed field oriented control strategies ("FOC").

While torque regulation has been contemplated in the past, unfortunately the regulation schemes adopted have not been very accurate. To this end, generally, at speeds below the rated motor speed, it has been assumed that the developed motor torque has been equal to a reference torque value. At speeds above rated speed, torque has been regulated in a pseudo open loop manner by dividing the torque reference value by an estimate of motor flux reduction value. More specifically, the torque reference is divided by a term proportional to the motor operating speed that is an estimate of the reduction in motor flux. Unfortunately, the term proportional to operating speed is a relatively inaccurate estimate of motor flux reduction and therefore torque regulation via one of these schemes is not very accurate. In addition, while system torque can change rapidly, operating frequency changes relatively slowly and therefore, in some cases, stability problems have been known to occur when operating frequency is used as an estimator of flux reduction. While such inaccurate torque regulators may work in some applications, such limited regulating capabilities are not acceptable for other applications.

Therefore, it would be advantageous to have a system that estimates torque quickly and accurately.

BRIEF SUMMARY OF THE INVENTION

It has been recognized that easily obtainable control system signals can be obtained and used to generate an essentially real time instantaneous torque estimate value that can in turn be used to drive a torque trim regulator thereby generating a torque command value that can in turn be used to trim a reference voltage value thus driving the torque applied to an induction machine toward a reference and desired torque value. The torque estimate can be derived by combining feedback current values with several different sets of obtainable system signals. Thus, a simple and accurate torque regulator can be configured.

Consistent with the above, at least some embodiments of the invention include a method for use with a controller for controlling a machine wherein a torque reference value is provided, the method comprising the steps of obtaining feedback current values corresponding to the currents provided to the machine, mathematically combining the feedback current values to generate an error value, mathematically combining the error value and the torque reference value to generate a torque command value and using the torque command value to control the machine. In some cases the step of obtaining feedback currents includes obtaining d and q-axis feedback currents and wherein the step of using the torque command value to control the machine includes generating a q-axis command voltage value as a function of the torque command value and using the q-axis command voltage value to drive the machine. In some cases the step of mathematically combining the error value and the torque reference value includes adding a derivative of the error value and a derivative of the torque reference value.

In at least some embodiments the step of mathematically combining the d and q-axis feedback current values to generate an error value includes mathematically combining the feedback current values to generate a torque estimate value and subtracting the torque estimate value from the torque reference value to provide the error value.

In some cases the method further includes the steps of determining the operating frequency of the machine, mathematically combining the operating frequency and the q-axis feedback current value to provide a d-axis flux estimate and deriving a d-axis command voltage value as a function of the d-axis flux estimate and, wherein, the step of mathematically combining the feedback current values to generate the torque estimate includes combining the feedback currents and the d and q-axis command voltage values to generate the torque estimate.

The method may also include the steps of identifying a system operating frequency, mathematically combining the operating frequency and the torque reference value to generate a power reference value and, wherein, the step of mathematically combining to generate an error value includes combining the feedback current values to generate a power estimate and subtracting the power estimate from the power reference value. Here, the step of mathematically combining the error value and the torque reference value to generate a torque command value may include the steps of combining derivatives of each of the power reference value and the power error value to generate the torque reference value.

In at least some embodiments the error value is a power error value and the step of mathematically combining the error value and the torque reference value to generate a torque command value includes the steps of converting the torque reference value into a power reference value and combining derivatives of each of the power reference value and the power error value to generate the torque reference value to generate the torque command value. In some cases the step of converting the torque reference value to a power reference value includes the step of multiplying the torque reference value by a system operating frequency.

The invention also includes an apparatus for use with a controller for controlling a machine wherein a torque reference value is provided, the apparatus for identifying an error indicative of the difference between the reference torque value and the torque applied to the machine and using the error value to modify control of the machine, the apparatus comprising sensors for obtaining current values corresponding to the currents provided to the machine and a processor running software to mathematically combine the current values to generate an error value, mathematically combine the error value and the torque reference value to generate a torque command value and use the torque command value to control the machine.

The invention further includes an apparatus for use with a controller providing command voltage signals to drive a pulse width modulated (PWM) inverter linked to a machine wherein a torque reference value is provided, the apparatus for identifying an error indicative of the difference between the reference torque value and the torque applied to the machine and using the error value to modify a q-axis command voltage value used to control the machine, the apparatus comprising sensors for obtaining d and q-axis feedback current values corresponding to the currents provided to the machine, an estimator for mathematically combining the d and q-axis feedback current values to generate an error value, a torque regulator for mathematically combining the error value and the torque reference value to generate a torque command value and a processor using the torque command value to generate the q-axis command voltage value.

Moreover, the invention includes a method for use with a controller for controlling a machine, the method comprising the steps of receiving a reference torque value, obtaining feedback signals from the machine during machine operation, deriving an estimate indicative of torque applied to the machine and controlling the machine as a function of both the reference torque value and the estimate.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
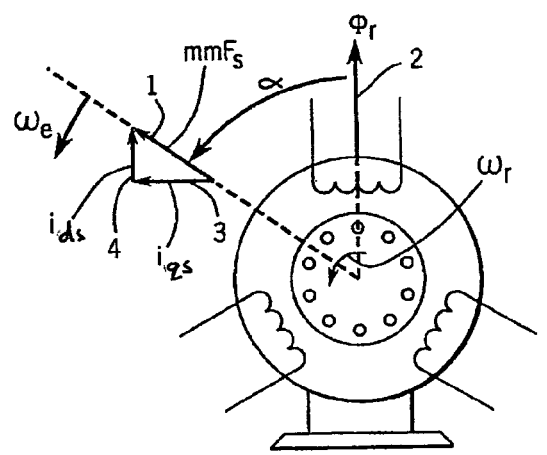
FIG. 1 is a schematic diagram illustrating the relationships between various currents and magnetic fields in an induction machine.

Hereinafter, unless indicated otherwise, an "*" will indicate a command signal, a "qs" subscript will indicate a signal associated with a stator q-axis in a d-q frame of reference, a "ds" subscript will indicate a signal corresponding to the d-axis in a d-q frame of reference, a "s" subscript will indicate a signal associated with a motor stator, a "ref" subscript will be used to indicate a reference signal that incorporates some quantities determined and programmed during a commissioning procedure, an "est" subscript will be used to refer to an estimated value, a "fb" subscript will be used to refer to a feedback signal, "u" subscript and "v" subscripts will be used to refer to signals associated with two of the three phases of a motor and a "reg" subscript will be used to refer to a regulated value.

In addition, note that the term "derivative" is used herein to refer to two different mathematical concepts and that the context of the text in which the term appears should be used to determine which of the two meanings should be applied. First, derivative is used to refer to a change with respect to time as in Equations 2 and 3 below. Second, in some cases, the term derivative is used to refer to any derivation from an initial value. For instance, applying a proportional or proportional-integral gain to an initial value may result in a derivative of the initial value. Hereinafter the terms "value" and "signal" are generally used interchangeable.

While the present invention may be employed with adjustable frequency controllers to deliver current to any of several different types of loads including AC motors, generators, grid-tie inverters, etc., in the interest of simplifying this explanation, unless indicated otherwise, the invention will be described in the context of a system providing currents to an AC motor.

A. Theory

As a fundamental basis for the present invention, the electromagnetic torque of an AC motor can be expressed by the following equation:

$$T = \frac{3}{2} \cdot \left(\frac{P}{2}\right) \cdot (\lambda_{ds} \cdot i_{qs} - \lambda_{qs} \cdot i_{ds}) \quad \text{Eq. 1}$$

where,

P is the number of motor poles;

$i_{qs}$ is motor current aligned with the q-axis and typically reflects motor load;

$i_{ds}$ is motor current aligned with the d-axis and typically motor flux current;

$\lambda_{ds}$ is motor flux aligned with the d-axis; and $\lambda_{qs}$ is motor flux aligned with the q-axis.

As well known in the art, the voltage equations in a dq frame of reference for an induction machine can be expressed as:

$$V_{qs} = r_s \cdot i_{qs} + \omega_e \cdot \lambda_{ds} + p\lambda_{qs} \quad \text{Eq. 2}$$

$$V_{ds} = r_s \cdot i_{ds} - \omega_e \cdot \lambda_{qs} + p\lambda_{ds} \quad \text{Eq. 3}$$

where, $r_s$ is the stator resistance; and p is derivative operator $$\frac{d}{dt}.$$

In steady state the last terms in each of Equations 2 and 3 drops out. Thus, in steady state, Equations 1 through 3 can be combined to express motor torque T using the following equation:

$$T = \frac{3}{2} \cdot \left(\frac{P}{2}\right) \cdot \left(\left(\frac{V_{qs} - r_s \cdot i_{qs}}{\omega_e}\right) \cdot i_{qs} + \left(\frac{V_{ds} - r_s \cdot i_{ds}}{\omega_e}\right) \cdot i_{ds}\right) \quad \text{Eq. 4}$$

Equation 4 can be rewritten using values that are generally easy to obtain in a control system. To this end, most control systems generate both d and q-axis command voltage values $V_{ds}^*$ and $V_{qs}^*$ and, generally, d and q-axis feedback current values $i_{dsfb}$ and $i_{qsfb}$ are available.

Thus, Equation 4 can be rewritten as follows:

$$T_{est} = \frac{3}{2} \cdot \left(\frac{P}{2}\right) \cdot \left(\left(\frac{V_{qs}^* - r_s \cdot i_{qsfb}}{\omega_e}\right) \cdot i_{qsfb} + \left(\frac{V_{ds}^* - r_s \cdot i_{dsfl}}{\omega_e}\right) \cdot i_{dsfb}\right) \quad \text{Eq. 5}$$

Referring to Equation 5, it should be appreciated that the values required to solve Equation 5 can be readily ascertained and used to identify an essentially instantaneous and real time torque estimate $T_{est}$. Where a torque reference or control value $T_{ref}$ is provided to a system indicating a desired torque, the instantaneous applied torque estimate $T_{est}$ can be compared to the input torque value and the difference can be used to adjust the voltages applied to the load thereby causing the torque to converge toward the reference torque value $T_{ref}$.

B. First Embodiment Implementation

Figure 2:
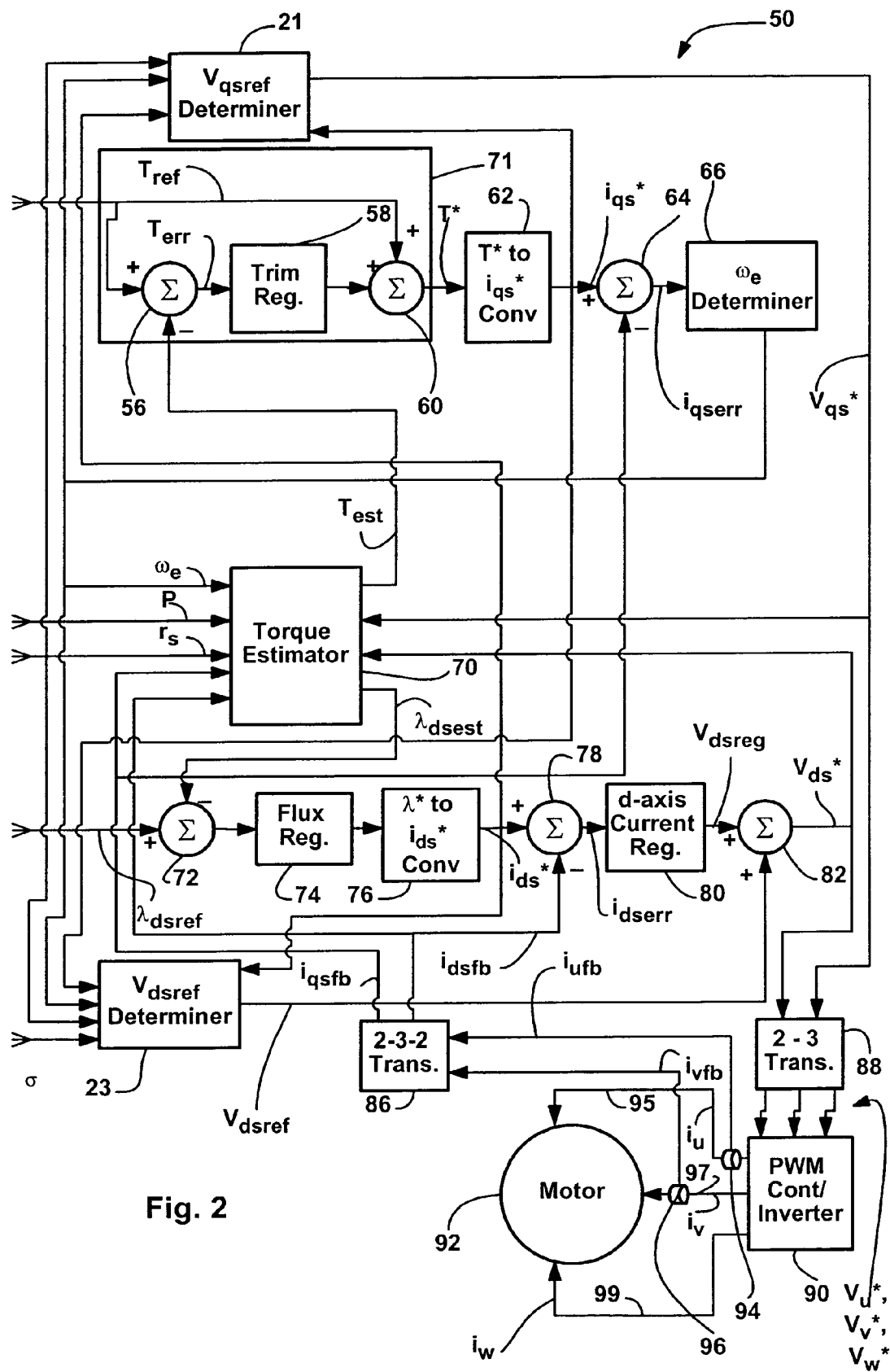
FIG. 2 is a schematic diagram illustrating an exemplary control system according to at least one embodiment of the present invention.

Referring now to the drawings wherein like symbols and numerals are used to refer to similar elements throughout the several views and, more specifically, referring to FIG. 2, the present invention will be described in the context of an exemplary motor control system 50 that, in general, receives both a torque reference signal $T_{ref}$ and a d-axis flux reference signal $\lambda_{dsref}$ and uses those two signals to generate AC voltages on three separate supply lines 95, 97, 99 linked to motor 92. System 50 includes various feedback loops that enable essentially instantaneous and real time control of torque applied to motor 92 so that the applied torque can be made essentially equal to the reference torque value $T_{ref}$. In FIG. 2, two current sensors 94 and 96 (e.g., Hall effect sensors) are coupled to two of the three supply lines (e.g., 95 and 97) that are linked to motor 92 to sense currents passing therethrough and generate feedback current signals $i_{ufb}$ and $i_{vfb}$ which are provided to a two-three-two transformer 86.

Transformer 86 first uses feedback signals $i_{ufb}$ and $i_{vfb}$ to identify the current passing through third line 99 linked to motor 92 thereby transforming the two feedback currents into three feedback currents. Next, transformer 86 transforms the three phase currents into d and q-axis two-phase currents $i_{dsfb}$ and $i_{qsfb}$. d and q-axis feedback currents $i_{dsfb}$ and $i_{qsfb}$ are provided to other system 50 components to determine how to alter the voltages applied to motor 92 via the three supply lines 95, 97 and 99 to drive motor 92 as desired.

Referring still to FIG. 2 and, more specifically, according to the present invention, system 50 includes both a torque estimator 70 and a torque regulator 71. Estimator 70 receives the d and q-axis feedback signals $i_{dsfb}$ and $i_{qsfb}$, respectively, and uses those signals along with other system specific values identified during a commissioning procedure to, among other things, generate an instantaneous torque estimate value $T_{est}$ representative of the instantaneous torque applied to motor 92. Torque estimate $T_{est}$ is provided to torque regulator 71 which uses estimate $T_{est}$ and the torque reference value $T_{ref}$ to generate a torque command value T* which is trimmed or adjusted so as to, essentially in real time, cause the torque applied to motor 92 to be equal to the input torque value $T_{ref}$.

Prior to operation of system 50 and, during a commissioning procedure, the system specific values that are determined and then programmed for subsequent use by system 50 include a value P (hereinafter the "pole count") indicating the number of poles associated with motor 92, a flux reference $\lambda_{dsref}$, a transient inductance value $L_\sigma$ and the stator resistance value $r_s$. Various algorithms exist for identifying system specific inductance value $L_\sigma$, resistance value $r_s$, and d-axis flux reference $\lambda_{dsref}$ and any of those algorithms may be used here.

Referring still to FIG. 2, in addition to estimator 70, regulator 71, motor 92, sensors 94 and 96 and transformer 86, system 50 includes a q-axis command voltage determiner 21, four summer blocks 64, 72, 78 and 82, a q-axis torque to current converter 62, a frequency determiner 66, a flux regulator 74, a flux to d-axis current converter 76, a d-axis current regulator 80, a two-to-three phase transformer 88 and PWM controller/inverter module 90 and a d-axis reference voltage determiner 23.

Determiner 66 uses a q-axis error value $i_{qserr}$ to determine an operating frequency $\omega_e$ that is provided to each of determiners 21 and 23 and to estimator 70. In addition to receiving frequency $\omega_e$, determiner 21 also obtains resistance value $r_s$ and receives q-axis command current $i_{qs}^*$, d-axis command current $i_{ds}^*$ and d-axis flux reference $\lambda_{dsref}$ and solves the following equation to identify q-axis command voltage $V_{qsref}$ which is:

$$V_{qs}^* = r_s i_{qs}^* + \omega_e \lambda_{dsrf} \qquad \text{Eq. 6}$$

As indicated above, torque regulator 71 receives each of the torque reference value $T_{ref}$ and the torque estimate $T_{est}$ and uses those values to generate torque command value $T^*$. Command value $T^*$ is provided to torque to q-axis current converter 62.

Converter 62 scales the received torque command value $T^*$ providing the q-axis current command value $i_{qs}^*$ to summer 64. In addition to receiving the q-axis current command value $i_{qs}^*$, summer 64 also receives the q-axis feedback signal $i_{qsfb}$ described above and subtracts the q-axis feedback signal $i_{qsfb}$ from the q-axis command signal $i_{qs}^*$ providing the q-axis current error signal $i_{qserr}$.

Referring yet again to FIG. 2, summer 72 receives each of the d-axis flux estimate $\lambda_{dsest}$ and the d-axis flux reference value $\lambda_{dsref}$ and subtracts estimated value $\lambda_{dsest}$ from reference value $\lambda_{dsref}$ and provides the difference to flux regulator 74. In at least some embodiments, flux regulator 74 is a PI regulator. Regulator 74 converts the received value to a command flux value $\lambda^*$. Flux to d-axis current converter 76 scales the command flux value $\lambda^*$ thereby generating a d-axis command current value $i_{ds}^*$.

Summer 78 receives each of the d-axis command current signal $i_{ds}^*$ and d-axis feedback current signal $i_{dsfb}$ and subtracts feedback signal $i_{dsfb}$ from command signal $i_{ds}^*$ thereby generating a d-axis current error signal $i_{dserr}$. d-axis current regulator 80 is, in at least some embodiments, a PI regulator. Regulator 80 converts its input to a regulated d-axis voltage value $V_{dsreg}$ which is provided to summer 82.

In addition to receiving frequency $\omega_e$, determiner 23 also obtains resistance value $r_s$ and inductance value $L_\sigma$ and receives q-axis and d-axis command currents $i_{qs}^*$ and $i_{ds}^*$, respectively, and solves the following equation to identify d-axis reference voltage $V_{dsref}$:

$$V_{dsref} = r_s i_{ds}^* - \omega_e L_\sigma i_{qs}^* \qquad \text{Eq. 7}$$

d-axis reference voltage signal $V_{dsref}$ is provided to summer 82. Summer 82 adds received values thereby generating a d-axis command voltage signal $V_{ds}^*$. As illustrated, each of the d and q-axis command voltage signals $V_{ds}^*$ and $V_{qs}^*$ are provided to two-to-three phase transformer 88. Transformer 88 converts the d and q-axis command voltage signals $V_{ds}^*$ and $V_{qs}^*$ to three phase command signals $V_u^*$, $V_v^*$ and $V_w^*$ which are provided to controller/inverter module 90. Module 90 uses the three phase command voltage values to generate voltages on, and associated currents through, supply lines 95, 97 and 99 linked to motor 92 as well known in the art.

Referring again to FIG. 2, torque regulator 71 includes summers 56 and 60 and a trim regulator 58. As illustrated, the reference torque value $T_{ref}$ is provided to each of summer 60 and summer 56. In addition to receiving the reference torque value $T_{ref}$, summer 56 also receives the torque estimate value $T_{est}$. Summer 56 subtracts estimated value $T_{est}$ from reference torque value $T_{ref}$ thereby generating a torque error value $T_{err}$ which is provided to trim regulator 58. Regulator 58 is, in at least some embodiments, a PI regulator. The output of regulator 58 is provided as a second input to summer 60. Summer 60 adds the value received from trim regulator 58 and the torque reference value $T_{ref}$ thereby generating the torque command value $T^*$ described above. Thus, where the estimate $T_{est}$ of applied torque is lower than the reference value $T_{ref}$, regulator 71 has the effect of increasing the torque command value $T^*$ thereby stepping up the applied torque and causing the applied torque value to converge on the reference value $T_{ref}$.

Referring still to FIG. 2, in addition to receiving the d and q-axis feedback currents $i_{dsfb}$ and $i_{qsfb}$, respectively, torque estimator 70 accesses pole count value P and stator resistance value $r_s$. Moreover, the d and q-axis command voltage values $V_{ds}^*$ and $V_{qs}^*$ output by summers 82 and 68 are fed back to torque estimator 70 and an output frequency value $\omega_e$ is obtained. Estimator 70 mathematically combines all of the received values to generate torque estimate $T_{est}$. In addition, estimator 70 combines some of the values accessed or received to generate the d-axis flux estimate $\lambda_{dsest}$.

Figure 3:
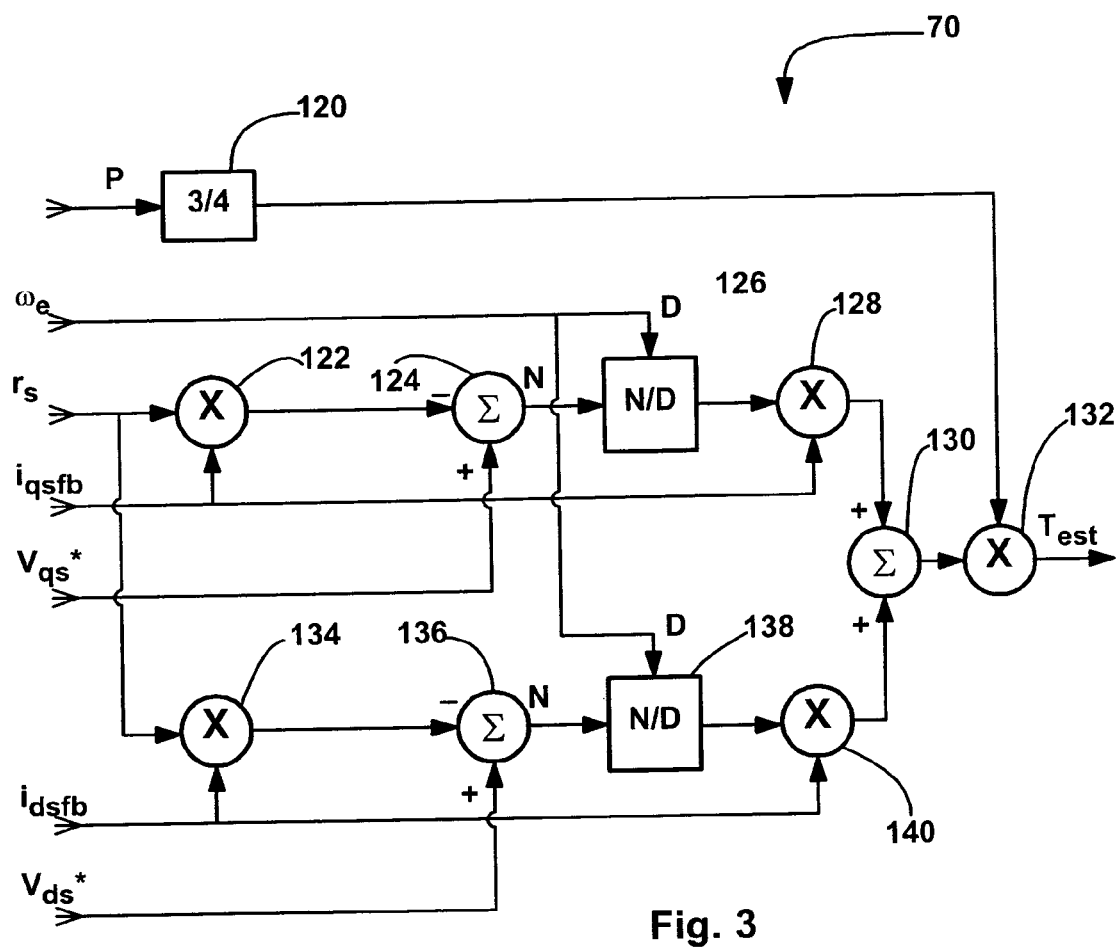
FIG. 3 is a schematic diagram illustrating components of the torque estimator of FIG. 2 according to at least one embodiment of the present invention.

To identify torque estimate $T_{est}$, estimator 70 evaluates Equation 5 above. To this end, referring to FIG. 3, estimator 70 includes a gain block 120, five multipliers 122, 128, 132, 134 and 140, three summers 124, 130 and 136 and two dividers 126 and 138. Value P corresponding to the number of poles associated with motor 92 is provided to block 120 which multiplies value P by ¾ and provides its output to multiplier 132. Stator resistance value $r_s$ is provided to each of multipliers 122 and 134. Multiplier 122 also receives the q-axis feedback current signal $i_{qsfb}$ and multiplies feedback signal $i_{qsfb}$ by resistance value $r_s$ providing its output to summer 124. Summer 124 subtracts the output of multiplier 122 from the q-axis command voltage value $V_{qs}^*$ and provides its output to divider 126. Divider 126 divides the output of summer 124 by frequency $\omega_e$ and provides its output to multiplier 128. Multiplier 128 multiplies the output of divider 126 by the q-axis feedback signal $i_{qsfb}$ and provides its output to summer 130.

Multiplier 134 multiplies the d-axis feedback current signal $i_{dsfb}$ by the stator resistance value $r_s$, and provides its output to summer 136. Summer 136 subtracts the output of multiplier 134 from the d-axis command voltage value $V_{ds}^*$ and provides its output to divider 138. Divider 138 divides the output of summer 136 by frequency $\omega_e$ and provides its output to multiplier 140. Multiplier 140 multiplies the output of divider 138 by the d-axis feedback current signal $i_{dsfb}$ and provides its output to summer 130. Summer 130 adds the outputs of multipliers 128 and 140 and provides its output to multiplier 132. Multiplier 132 multiplies the outputs of block 120 and summer 130 thereby generating the torque estimate value $T_{est}$ which is provided to torque regulator 71 in FIG. 2.

C. Experimental Results

Figure 8:
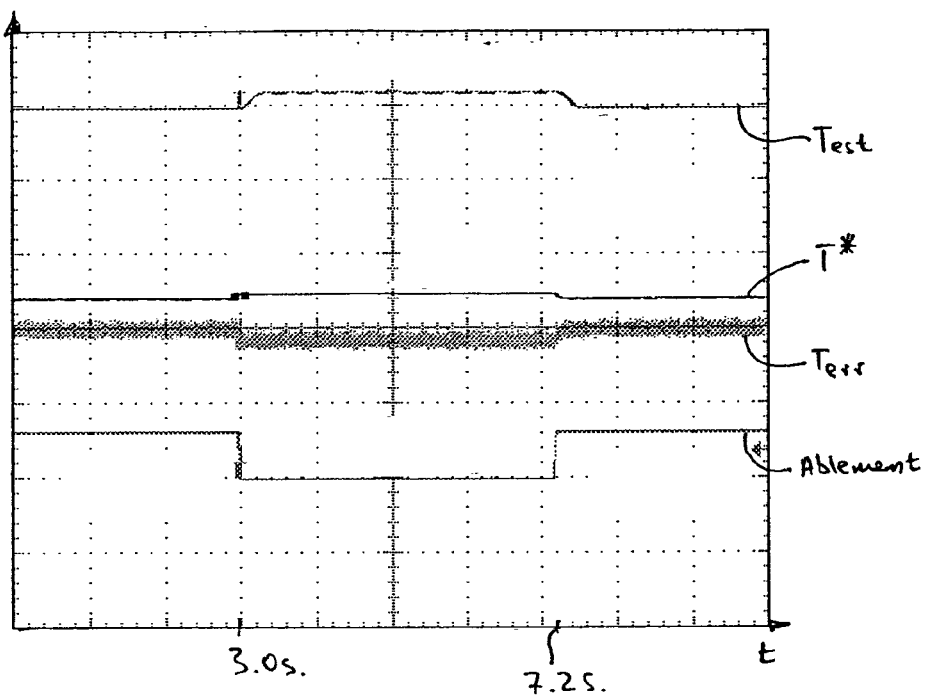
FIG. 8 is a graph illustrating a command torque value, a resulting shaft torque value, a torque error value and a torque regulator control signal when an inventive system is driven at a first operating frequency.

FIG. 8 illustrates the effects of operation with and without the inventive torque regulator described above. To generate the waveforms in FIG. 8, a 5 HP, 460 V, 60 Hz, 6.5 Arms, 1780 RPM induction motor was operated in a torque regulation mode at 900 RPM. The torque reference was set to 100% of the name plate torque for the system used and the torque regulator described above was initially enabled. At approximately 3 seconds, the regulator was disabled and the change in torque error, torque command and measured shaft torque illustrated occurred. The resulting error was approximately 3% of the rated motor torque. At 7.2 seconds the regulator was re-enabled and the torque error was again eliminated.

Figure 9:
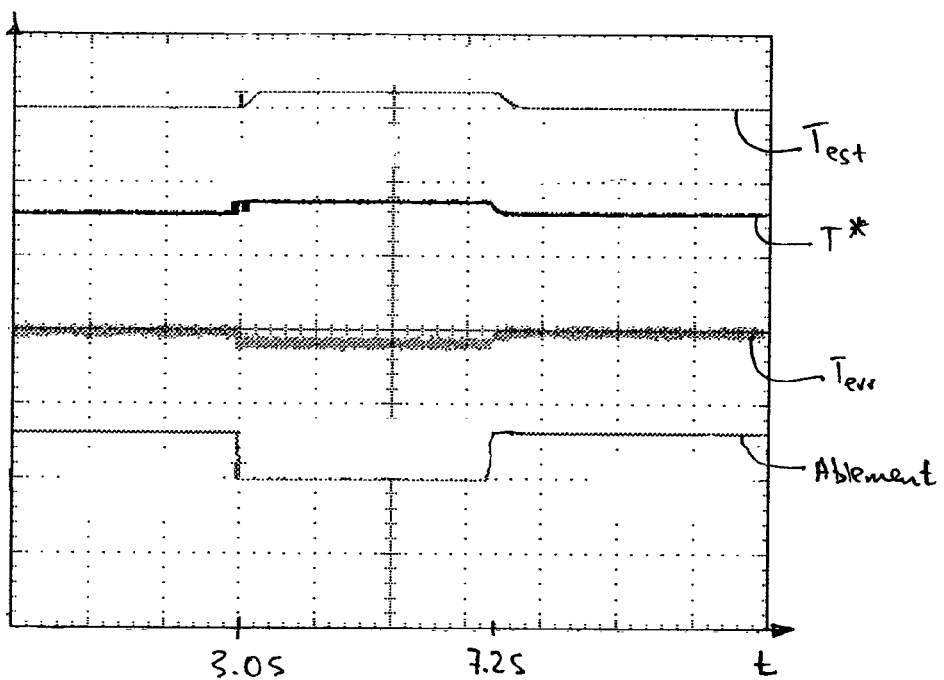
FIG. 9 is a graph similar to FIG. 8, albeit illustrating the signals when the system is driven at a second operating frequency that is higher than the first operating frequency.

FIG. 9 contains experimental results similar to those described above with respect to FIG. 8 except that the operating frequency used to generate the waveforms in FIG. 9 was 2400 RPM instead of 900 RPM. Again, the torque regulator was initially enabled, was disabled at 3 seconds and then was re-enabled at 7.2 seconds. Here, the torque command signal was increased above the rated operating speed to compensate for field weakening effects. The torque reference value $T_{ref}$ (not illustrated) remained at 100% of the name plate torque value.

D. Additional Exemplary Embodiments

Figure 10:
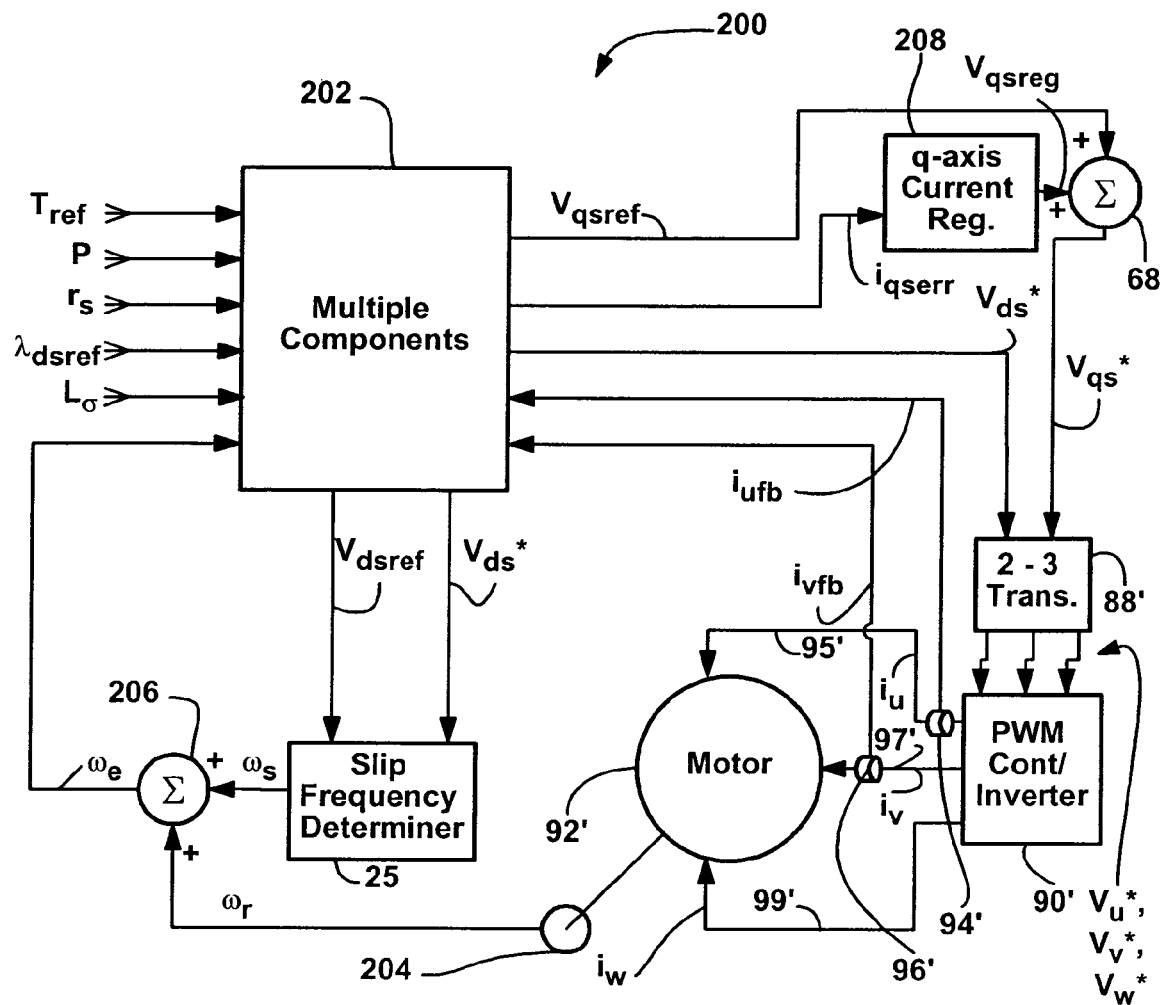
FIG. 10 is a schematic diagram of yet another inventive embodiment.

The example above assumes that an encoder or other type of speed feedback device is not provided to generate a rotor speed signal useable to determine the operating frequency of the system. Some systems will include a speed feedback device. In these cases a slightly different topographical control system may be employed, albeit the torque regulator and torque estimator operating in the same manner as described above in at least some embodiments. To this end, referring now to FIG. 10, an exemplary control system 200 that includes a speed feedback device is illustrated. In FIG. 10, many of the components are similar to the components described above with respect to FIG. 2 and therefore are not described again here in detail. To indicate similarity, some of the components are identified by numbers as above followed by a "'". For instance, the PWM converter/inverter in FIG. 10 is identified by numeral 90' the 2-3 phase transfer is identified by numeral 88' and so on. In addition, components 21, 71, 62, 64, 70, 72, 74, 76, 78, 80, 82, 23 and 86 in FIG. 2 have been lumped together in FIG. 10 as block 202 to simplify FIG. 10.

Referring to FIG. 10, an encoder 204 is attached to motor 92' for determining rotor speed and generating a rotor speed signal $\omega_r$ indicative thereof. Referring also to FIG. 2, the d-axis voltage command signal $V_{ds}^*$ from summer 82 and the d-axis reference signal $V_{dsref}$ from determiner 23 are provided to slip frequency determiner 25 which uses those signals to generate a slip frequency signal $\omega_s$. A summer 206 adds the rotor and slip frequency values to determine operating frequency $\omega_e$ which is provided along with other values (e.g., $L_o$, $r_s$, etc.) to block 202.

Referring still to FIGS. 2 and 10, determiner 21 solves Equation 6 to identify a q-axis reference voltage $V_{qsref}$. The q-axis current error $i_{qserr}$ is provided to a q-axis current regulator 208 which generates a regulated q-axis voltage value $V_{qsreg}$. A summer 68 adds the q-axis regulated and reference voltages to generate the q-axis command voltage $V_{qs}^*$. As in FIG. 2, in FIG. 10 the d and q-axis command voltages are provided to 2-3 phase transformer 88' and are used thereby to drive converter/inverter 90'.

One alternative embodiment of the present invention uses the outputs of current regulators 80 and 208 (see again FIGS. 2 and 10) to adjust the torque estimate $T_{est}$ instead of using the command voltage values $V_{ds}^*$ and $V_{qs}^*$.

To this end, it has been recognized that the general torque Equation 1 can be rewritten as follows:

$$T_{ref} = \frac{3}{2} \cdot \left(\frac{P}{2}\right) \cdot (\lambda_{dsref} \cdot i_{qs} - \lambda_{qsref} \cdot i_{ds}) \qquad \text{Eq. 8}$$

Referring again to FIGS. 2 and 10, q-axis command voltage $V_{qs}^*$ is equal to the sum of the q-axis regulated voltage value $V_{qsreg}$ and the q-axis reference voltage value $V_{qsref}$ and the d-axis command voltage $V_{ds}^*$ is equal to the sum of the d-axis regulated voltage value $V_{dsreg}$ and the d-axis reference voltage value $V_{dsref}$. Thus, Equation 4 above can be rewritten as follows:

$$T_{est} = \frac{3}{2} \cdot \left(\frac{P}{2}\right) \cdot \left[\begin{array}{l}\left(\dfrac{V_{qsref} + V_{qsreg} - r_s \cdot i_{qsfb}}{\omega_e}\right) \cdot i_{qsfb} + \\ \left(\dfrac{V_{dsref} + V_{dsreg} - r_s \cdot i_{dsfb}}{\omega_e}\right) \cdot i_{dsfb}\end{array}\right] \qquad \text{Eq. 9}$$

Thus, in at least one other inventive embodiment, the torque estimator may obtain and receive each of values P, $\omega_e$, $r_s$, $V_{qsref}$, $V_{dsref}$, $V_{qsreg}$, $V_{dsreg}$, $i_{qsfb}$ and $i_{dsfb}$ and use those values to resolve Equation 9 to identify an instantaneous torque estimate $T_{est}$ essentially in real time. To this end, referring to FIG. 4, an exemplary second torque estimator 70' is illustrated that may be used to replace estimator 70 is FIG. 1. Here and in other exemplary systems described hereinafter, while the sources for the values obtained and received by estimator 70' (and other estimates described below) are not specifically illustrated, it should be apparent from a perusal of FIG. 2 where the values originate. For instance, the output of determiner 21 provides q-axis reference voltage value $V_{qsref}$, the output of regulator 66 provides q-axis regulated voltage value $V_{qsreg}$ and so on.

Figure 4:
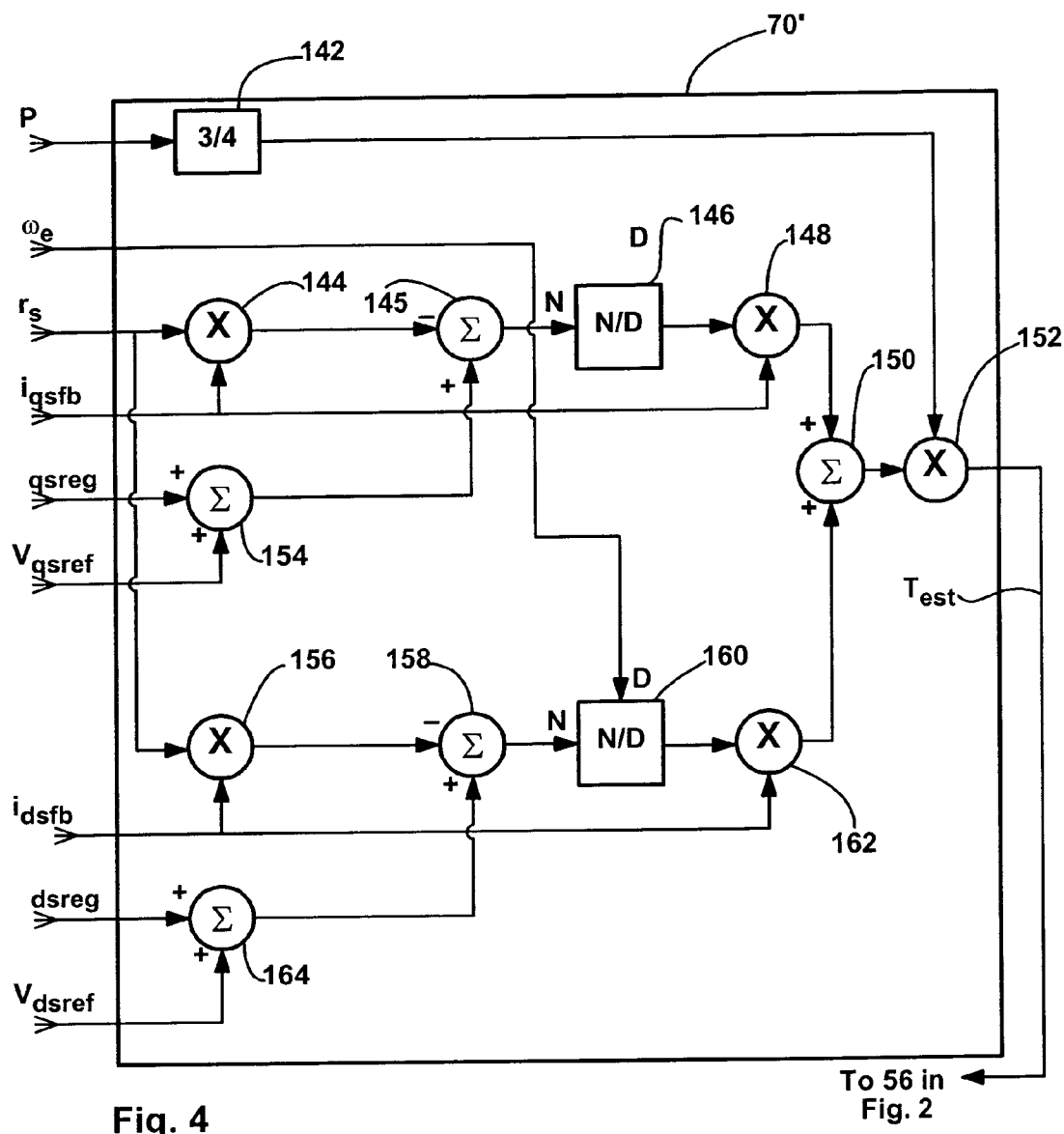
FIG. 4 is similar to FIG. 3, albeit illustrating components of a torque estimator according to a different embodiment of the present invention.

As illustrated in FIG. 4, the output of estimator 70' is provided to trim regulator 58 (see also FIG. 2). Estimator 70' includes a scalar block 142, five multipliers 144, 148, 152, 156, and 162, five summers 145, 150, 154, 158 and 164 and two dividers 146 and 160. Multiplier 144 multiplies the stator resistance value $r_s$, by the q-axis feedback current value $i_{qsfb}$ and provides its output to summer 145. Summer 154 adds the q-axis regulated voltage value $V_{qsreg}$ and the q-axis reference voltage value $V_{qsref}$ and provides its output to summer 145. Summer 145 subtracts the output of multiplier 144 from the output of summer 154 and provides its output to divider 146. Divider 146 divides the output of summer 145 by the operating frequency $\omega_e$ and provides its output to multiplier 148. Multiplier 148 multiplies the output of divider 146 by the q-axis feedback current value $i_{qsfb}$ and provides its output to summer 150.

Referring still to FIG. 4, summer 164 adds the d-axis regulated voltage value $V_{dsreg}$ and the d-axis reference voltage value $V_{dsref}$ and provides its output to summer 158. Multiplier 156 multiplies the stator resistance value $r_s$, and the d-axis feedback current value $i_{dsfb}$ and provides its output to summer 158. Summer 158 subtracts the output of multiplier 156 from the output of summer 164 and provides its output to divider 160. Divider 160 divides the output of summer 158 by operating frequency $\omega_e$ and provides its output to multiplier 162. Multiplier 162 multiplies the output of divider 160 by the d-axis feedback current value $i_{dsfb}$ and provides its output to summer 150. Summer 150 adds the outputs of multipliers 148 and 162 and provides its output to multiplier 152.

Scalar block 142 multiplies pole count value P by ¾ and provides its output to multiplier 152. Multiplier 152 multiplies the output of block 142 and the output of summer 150 and provides the estimated torque value $T_{est}$ pursuant to Equation 9 above. The estimated torque value $T_{est}$ is provided to summer 56 where estimated value $T_{est}$ is subtracted from torque reference value $T_{ref}$.

According to one additional exemplary embodiment of the present invention, it has been recognized that when the current regulators used in a system are capable of regulating the d and q-axis current errors to zero values in steady state, a simplified torque estimating algorithm may be employed to identify value $T_{est}$. To this end, as well known in the motor controls industry, the q-axis reference flux value $\lambda_{qsref}$ can be expressed as follows:

$$\lambda_{qsref} = L_\sigma i_{qs}^* \qquad \text{Eq. 10}$$

Combining Equations 7 and 10, the d-axis reference voltage $V_{dsref}$ can be expressed as:

$$V_{dsref} = r_s i_{ds}^* - \omega_e \lambda_{qsref} \qquad \text{Eq. 11}$$

Torque error $T_{err}$ (i.e., $T_{ref} - T_{est}$) can be represented by combining the terms in Equations 8, 9 and 11 to yield the following equation:

$$T_{err} = \frac{3}{2} \cdot \frac{P}{2} \cdot \begin{bmatrix} \left(\lambda_{dsref} - \frac{r_s \cdot i_{qsfb}}{\omega_e}\right) \cdot (i_{qs}^* - i_{qsfb}) - \\ \frac{V_{qsreg} \cdot i_{qsfb}}{\omega_e} - \left(\lambda_{qsref} - \frac{r_s \cdot i_{dsfb}}{\omega_e}\right) \cdot \\ (i_{ds}^* - i_{dsfb}) - \frac{V_{dsreg} \cdot i_{dsfb}}{\omega_e} \end{bmatrix} \qquad \text{Eq. 12}$$

Examining Equation 12, it has been recognized that when there is zero current error, several of the terms in Equation 12 are eliminated yielding the following equation:

$$T_{err} = \frac{3}{2} \cdot \frac{P}{2} \cdot \left[ -\frac{V_{qsreg} \cdot i_{qsfb}}{\omega_e} - \frac{V_{dsreg} \cdot i_{dsfb}}{\omega_e} \right] \qquad \text{Eq. 13}$$

Thus, referring again to FIG. 2, torque error $T_{err}$ may be determined according to Equation 13 when the current error is regulated to zero.

Figure 5:
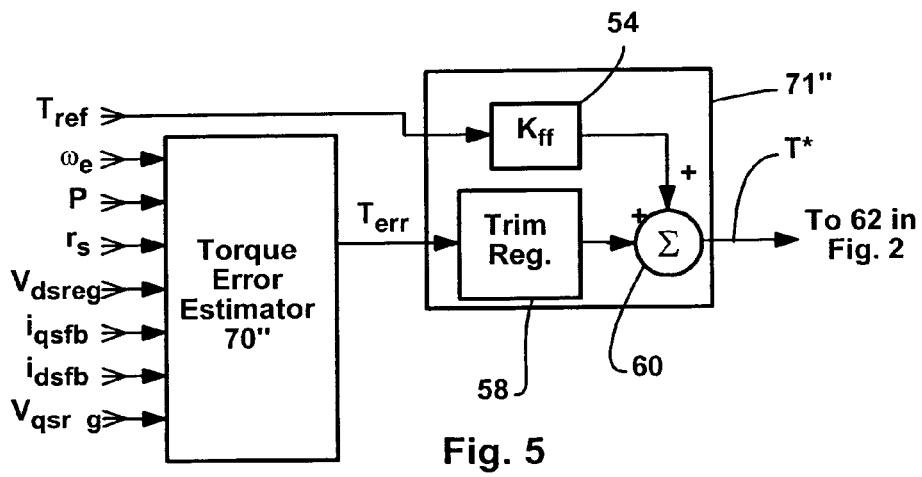
FIG. 5 is similar to FIG. 3, albeit illustrating a torque error estimator according to another embodiment of the invention.

Referring now to FIG. 5, an exemplary torque error estimator 70" and torque regulator 71" are illustrated that, it is contemplated, would be used to replace the torque estimator and regulator of FIG. 2. Here, consistent with Equation 13, torque estimator 70" receives operating frequency $\omega_e$, pole count P, d-axis and q-axis regulated voltage values $V_{dsreg}$ and $V_{qsreg}$, respectively, and d and q-axis feedback current values $i_{dsfb}$ and $i_{qsfb}$, respectively, and, uses those signals to evaluate Equation 13 thereby providing torque error value $T_{err}$. As illustrated in FIG. 5, in this case, torque error $T_{err}$ is provided directly to trim regulator 58. Components 58 and 60 in FIG. 5 operate in an identical manner to the similarly labeled components of FIG. 2 and therefore will not be described here in detail. As illustrated, regulator 71" generates torque command value T* which is provided to converter 62.

Figure 6:
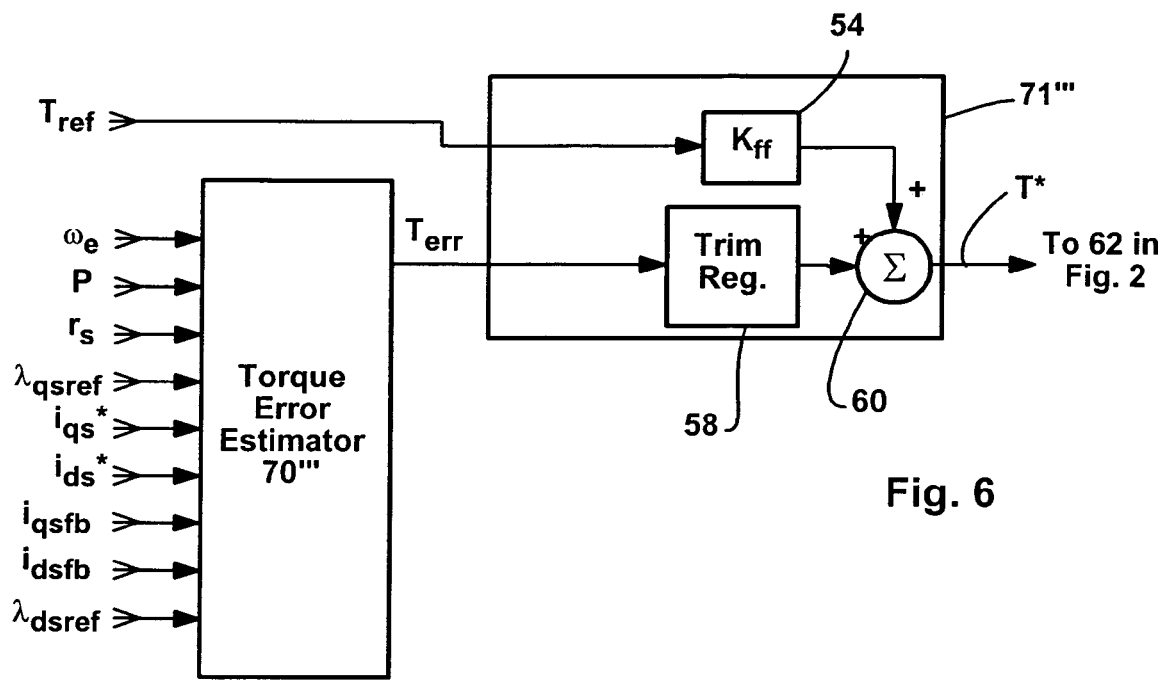
FIG. 6 is similar to FIG. 3, albeit illustrating one other torque error estimator.

In yet one additional embodiment of the present invention, a torque error value $T_{err}$ like the error generated by Equation 13 may, instead, be generated using Equation 12 above when the system current regulators cannot regulate the d and q-axis current errors to zero in steady state. In this regard, referring now to FIG. 6, yet one additional torque estimator 70''' and associated torque regulator 71''' are illustrated. The torque regulator 71''' in FIG. 6 operates in a fashion identical to regulator 71'' in FIG. 5 and therefore will not be described here in detail. As illustrated, estimator 70''' receives operating frequency $\omega_e$, pole count P, resistance value $r_s$, q-axis reference flux value $\lambda_{qsref}$, d-axis reference flux value $\lambda_{dsref}$, d and q-axis command current values $i_{ds}^*$ and $i_{qs}^*$, respectively, and d and q-axis feedback current values $i_{dsfb}$ and $i_{qsfb}$, and uses those values to evaluate Equation 12.

Figure 7:
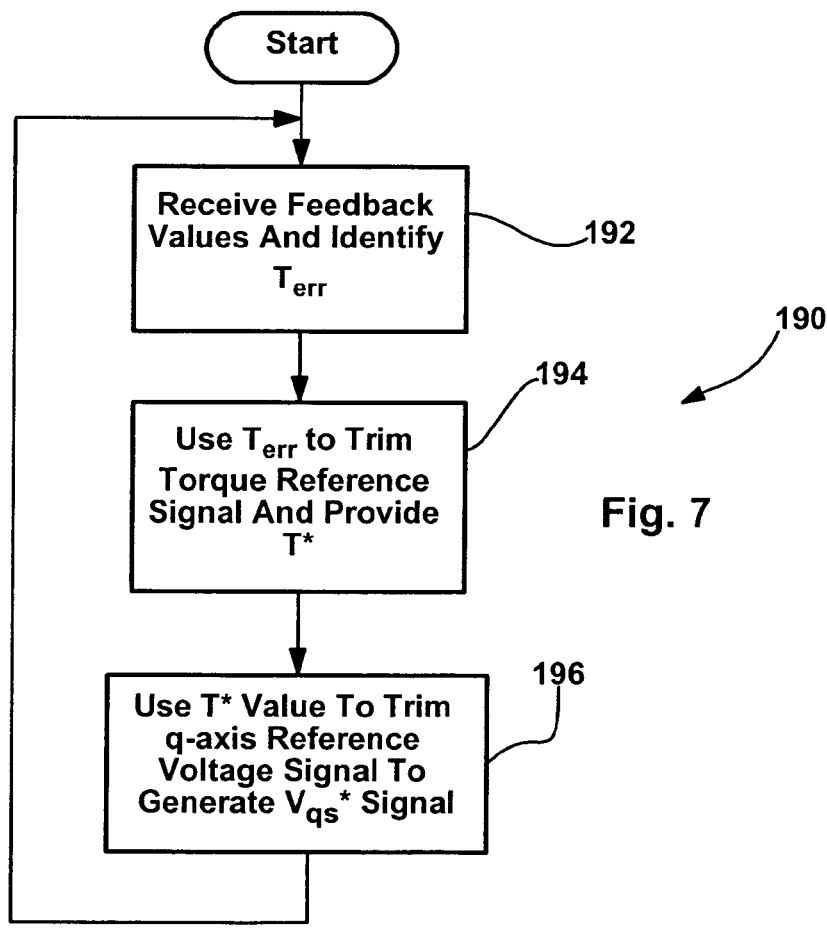
FIG. 7 is a flow chart illustrating a general method according to the present invention.

Referring now to FIG. 7, an exemplary general method 190 according to the present invention is illustrated. In this regard, after various system specific parameters have been identified and stored during a commissioning procedure and, during normal system operation, at block 192 feedback values and other calculated values are determined, identified or received and are used to identify an instantaneous torque error value $T_{err}$. At block 194, the instantaneous torque error value $T_{err}$ is used to trim the torque reference signal $T_{ref}$ thereby providing the command torque value T*. Next, at block 196, the command torque signal T* is used to trim the q-axis reference voltage signal $V_{qsref}$ thereby generating the q-axis command voltage value $V_{qs}^*$. This process is repeated during normal system operation.

Referring again to Equation 5, it should be appreciated that as the operating frequency $\omega_e$ approaches zero, the torque estimate $T_{est}$ quickly approaches an extremely large value that does not accurately reflect system torque. Thus, at low operating speeds some other algorithm for regulating torque may be required. In this regard, it has been recognized that power P can be expressed as:

$$P = T\omega_e \qquad \text{Eq. 14}$$

Thus, a power estimate Pest may be expressed by combining Equations 5 and 14 as:

$$P_{est} = \frac{3}{2} \cdot \left(\frac{P}{2}\right) \cdot ((V_{qs}^* - r_s i_{qsfb}) \cdot i_{qsfb} + (V_{ds}^* - r_s i_{dsfb}) \cdot i_{dsfb}) \qquad \text{Eq. 15}$$

The reference torque $T_{ref}$ can be converted to a reference power value $P_{ref}$ by multiplying value $T_{ref}$ by the operating frequency $\omega_e$. Thereafter, the reference power value $P_{ref}$ and the power estimate $P_{est}$ can be used to drive the torque regulator as above.

Figure 11:
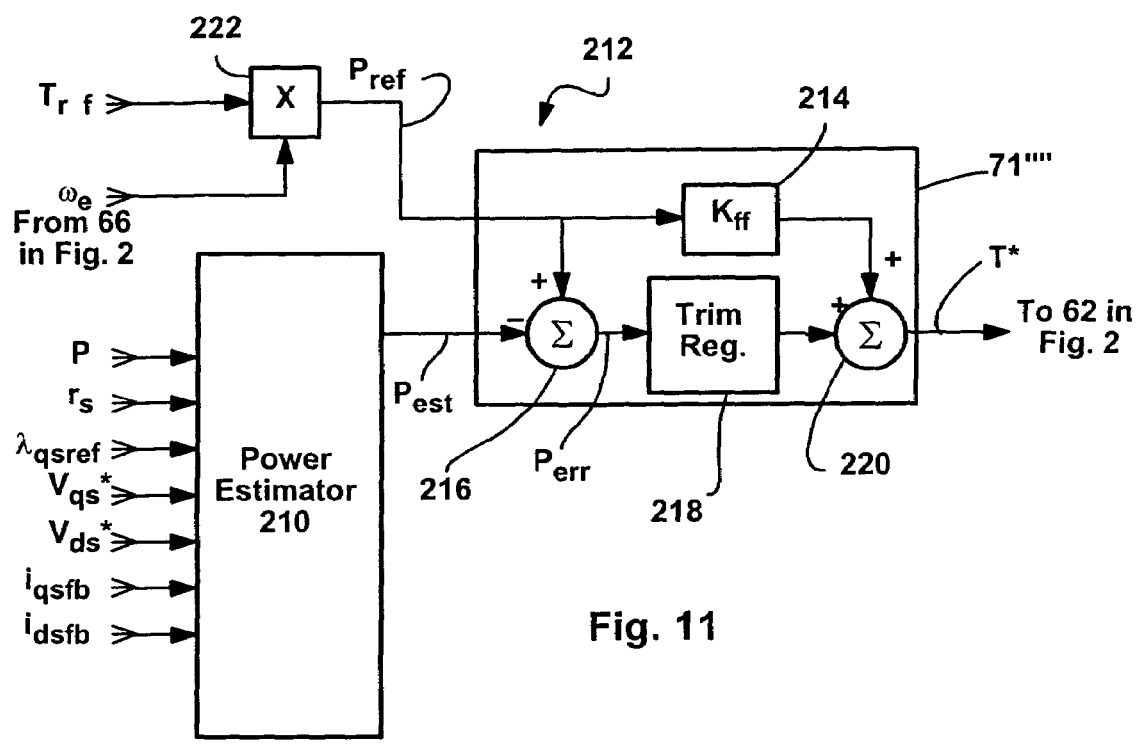
FIG. 11 is a schematic diagram of one other inventive embodiment.

Referring now to FIG. 11, a portion of one system 212 for comparing power values instead of torque values is illustrated. System 212 is meant to be used in conjunction with other components from FIG. 2 as indicated. The sub-system of FIG. 11 includes a multiplier 222, a power estimator 210 and a torque regulator 71''''. Referring also to FIG. 2, operating frequency $\omega_e$ from block 66 is provided to multiplier 222 along with torque reference $T_{ref}$. Multiplier 222 multiplies frequency $\omega_e$ and reference $T_{ref}$ to generate a power reference signal $P_{ref}$ consistent with Equation 14 above.

Power estimator 210 receives all of the values indicated and generates power estimate $P_{est}$ by evaluating Equation 15 above, estimate $P_{est}$ is provided to torque regulator 71'''' along with power reference $P_{ref}$. Regulator 71'''' scales reference $P_{ref}$ via block 214 and provides the scaled value to a summer 220. Another summer 216 subtracts power estimate $P_{est}$ from reference $P_{ref}$ to generate power error $P_{err}$. Error $P_{err}$ is regulated by a regulator 218 (e.g., a PI regulator) and the output of regulator 218 is provided to summer 220. Summer 220 adds received values and outputs a command torque value T* which is provided to converter 62 in FIG. 2 as illustrated.

It should be appreciated that, in addition to using power values in the embodiment of FIG. 2, power values may be substituted in any of the other embodiments described above by simply multiplying the reference torque by the operating frequency and altering the torque estimate equations by replacing the operating frequency with a one value.

It should be understood that the methods and apparatuses described above are only exemplary and do not limit the scope of the invention, and that various modifications could be made by those skilled in the art that would fall under the scope of the invention. For example, while various components are described above as performing various functions and steps of overall processes, it should be appreciated that a single programmable processor will often be employed to perform many of the steps. In addition, while described above as used with an FOC controller, the inventive methods and systems are also useable with non-FOC drives operating in steady state. Moreover, while the invention is described above in the context of induction motor control, the invention may be used to control both synchronous and permanent magnet motors. In these cases the slip frequency $\omega_s$ would be zero.

What is claimed is:

1. A method for use with a controller for controlling a machine wherein a torque reference value is provided, the method comprising the steps of:
   obtaining feedback current values corresponding to the currents provided to the machine;
   mathematically combining the feedback current values to generate an error value;
   mathematically combining the error value and the torque reference value to generate a torque command value; and
   using the torque command value to control the machine;
   wherein the step of obtaining feedback currents includes obtaining d and q-axis feedback currents, the step of mathematically combining the d and q-axis feedback current values to generate an error value includes mathematically combining the feedback current values to generate a torque estimate value and subtracting the torque estimate value from the torque reference value to provide the error value, the step of using the torque command value to control the machine includes generating a q-axis command voltage value as a function of the torque command value and using the q-axis command voltage value to drive the machine.

2. A method for use with a controller for controlling a machine wherein a torque reference value is provided, the method comprising the steps of:
   obtaining feedback current values corresponding to the currents provided to the machine;
   mathematically combining the feedback current values to generate an error value;
   mathematically combining the error value and the torque reference value to generate a torque command value; and
   using the torque command value to control the machine;
   wherein the step of mathematically combining the error value and the torque reference value includes adding a derivative of the error value and a derivative of the torque reference value.

3. The method of claim 1 further including the steps of determining the operating frequency of the machine, mathematically combining the operating frequency and the q-axis feedback current value to provide a d-axis flux estimate and deriving a d-axis command voltage value as a function of the d-axis flux estimate and, wherein, the step of mathematically combining the feedback current values to generate the torque estimate includes combining the feedback currents and the d and q-axis command voltage values to generate the torque estimate.

4. The method of claim 3 wherein the machine is characterized by a pole count P and a stator resistance value $r_s$ and, wherein, the step of combining to provide the torque estimate includes evaluating the following equation:

$$T_{est} = \frac{3}{2} \cdot \left(\frac{P}{2}\right) \cdot \left(\left(\frac{V_{qs}^* - r_s \cdot i_{qsfb}}{\omega_e}\right) \cdot i_{qsfb} + \left(\frac{V_{ds}^* - r_s \cdot i_{dsfb}}{\omega_e}\right) \cdot i_{dsfb}\right)$$

wherein $V_{qs}^*$ is the q-axis command voltage value, $V_{ds}^*$ is d-axis command voltage value, $i_{qsfb}$ is the q-axis feedback current value, $i_{dsfb}$ is the d-axis feedback current value and $\omega_e$ is the operating frequency.

5. A method for use with a controller for controlling a machine wherein a torque reference value is provided, the method comprising the steps of:
   obtaining feedback current values corresponding to the currents provided to the machine;
   mathematically combining the feedback current values to generate an error value;
   mathematically combining the error value and the torque reference value to generate a torque command value; and
   using the torque command value to control the machine;
   wherein the step of obtaining feedback currents includes obtaining d and q-axis feedback currents, the step of using the torque command value to control the machine includes generating a q-axis command voltage value as a function of the torque command value and using the q-axis command voltage value to drive the machine, the step of using the torque command value includes the steps of deriving a q-axis command current value from the torque command value, subtracting the q-axis feedback current value from the q-axis command current value to generate a q-axis error current value, deriving a q-axis regulated voltage value from the q-axis error current value and deriving the q-axis command voltage value as a function of the q-axis regulated voltage value.

6. The method of claim 5 further including the steps of determining the operating frequency of the machine, mathematically combining the operating frequency and the q-axis feedback current value to provide a d-axis flux estimate value, deriving a d-axis command current value from the d-axis flux estimate value, subtracting the d-axis feedback current value from the d-axis command current value to generate a d-axis error current value, deriving a d-axis regulated voltage value from the d-axis error current value and deriving a d-axis command voltage value as a function of the d-axis regulated voltage value.

7. The method of claim 6 wherein the machine is characterized by a pole count P and, wherein, the step of combining to provide the torque error value includes evaluating the following equation:

$$T_{err} = \frac{3}{2} \cdot \frac{P}{2} \cdot \left[ -\frac{V_{qsreg} \cdot i_{qsfb}}{\omega_e} - \frac{V_{dsreg} \cdot i_{dsfb}}{\omega_e} \right]$$

where $V_{qsreg}$ is the q-axis regulated voltage value, $V_{dsreg}$ is the d-axis regulated voltage value, $i_{qsfb}$ is the q-axis feedback current value, $i_{dsfb}$ is the d-axis feedback current value and $\omega_e$ is the operating frequency.

8. The method of claim 6 wherein the machine is characterized by a pole count P and a stator resistance value $r_s$, the method further including the step of deriving d and q-axis reference flux values, the step of combining to provide the torque error value including evaluating the following equation:

$$T_{err} = \frac{3}{2} \cdot \frac{P}{2} \cdot \left[ \begin{array}{c} \left(\lambda_{dsref} - \frac{r_s \cdot i_{qsfb}}{\omega_e}\right) \cdot (i_{qs}^* - i_{qsfb}) - \frac{V_{qsreg} \cdot i_{qsfb}}{\omega_e} - \\ \left(\lambda_{qsref} - \frac{r_s \cdot i_{dsfb}}{\omega_e}\right) \cdot (i_{ds}^* - i_{dsfb}) - \frac{V_{dsreg} \cdot i_{dsfb}}{\omega_e} \end{array} \right]$$

where $\lambda_{dsref}$ corresponds to the d-axis reference flux value, $\lambda_{qsref}$ corresponds to the q-axis reference flux value, $i_{qsfb}$ corresponds to the q-axis feedback current value, $i_{dsfb}$ corresponds to the d-axis feedback current value, $i_{qs}^*$ corresponds to the q-axis command current value, $i_{ds}^*$ corresponds to the d-axis command current value, $V_{qsreg}$ corresponds to the q-axis regulated voltage value, $V_{dsreg}$ corresponds to the d-axis regulated voltage value and $\omega_e$ corresponds to the operating frequency.

9. A method for use with a controller for controlling a machine wherein a torque reference value is provided, the method comprising the steps of:
obtaining feedback current values corresponding to the currents provided to the machine;
mathematically combining the feedback current values to generate an error value;
mathematically combining the error value and the torque reference value to generate a torque command value; and
using the torque command value to control the machine;
identifying a system operating frequency, mathematically combining the operating frequency and the torque reference value to generate a power reference value and, wherein, the step of mathematically combining to generate an error value includes combining the feedback current values to generate a power estimate and subtracting the power estimate from the power reference value.

10. The method of claim 9 wherein the step of mathematically combining the error value and the torque reference value to generate a torque command value includes the steps of combining derivatives of each of the power reference value and the power error value to generate the torque reference value.

11. A method for use with a controller for controlling a machine wherein a torque reference value is provided, the method comprising the steps of:
obtaining feedback current values corresponding to the currents provided to the machine;
mathematically combining the feedback current values to generate an error value;
mathematically combining the error value and the torque reference value to generate a torque command value; and
using the torque command value to control the machine;
wherein the error value is a power error value and the step of mathematically combining the error value and the torque reference value to generate a torque command value includes the steps of converting the torque reference value into a power reference value and combining derivatives of each of the power reference value and the power error value to generate the torque reference value to generate the torque command value.

12. The method of claim 11 wherein the step of converting the torque reference value to a power reference value includes the step of multiplying the torque reference value by a system operating frequency.

13. The method of claim 1 wherein the controller is a field oriented controller.

14. The method of claim 1 wherein the machine is one of an induction machine, a synchronous machine and a permanent magnet motor.

15. An apparatus for use with a controller providing command voltage signals to control a machine wherein a torque reference value is provided, the apparatus for identifying an error indicative of the difference between the reference torque value and the torque applied to the machine and using the error value to modify control of the machine, the apparatus comprising:
sensors for obtaining current values corresponding to the currents provided to the machine; and
a processor running software to:
mathematically combine the current values to generate an error value;
mathematically combine the error value and the torque reference value to generate a torque command value; and
use the torque command value to control the machine;
wherein the step of mathematically combining the error value and the torque reference value includes adding a derivative of the error value and a derivative of the torque reference value.

16. The apparatus of claim 15 wherein the sensors obtain d and q-axis feedback currents and wherein the step of using the torque command value to control the machine includes generating a q-axis command voltage value as a function of the torque command value and using the q-axis command voltage value to drive the machine.

17. An apparatus for use with a controller providing command voltage signals to control a machine wherein a torque reference value is provided, the apparatus for identifying an error indicative of the difference between the reference torque value and the torque applied to the machine and using the error value to modify control of the machine, the apparatus comprising:
sensors for obtaining current values corresponding to the currents provided to the machine, the sensors obtaining d and q-axis feedback currents; and
a processor running software to:
mathematically combine the current values to generate an error value;
mathematically combine the error value and the torque reference value to generate a torque command value; and
derive a q-axis command current value from the torque command value;

subtract the q-axis feedback current value from the q-axis command current value to generate a q-axis error current value;

derive a q-axis regulated voltage value from the q-axis error current value;

derive a q-axis command voltage value as a function of the q-axis regulated voltage value; and use the q-axis command voltage value to drive the machine.

18. The apparatus of claim 17 further including a frequency determiner for determining the operating frequency of the machine and, wherein, the processor mathematically combines the operating frequency and the q-axis feedback current value to provide a d-axis flux estimate value, derives a d-axis command current value from the d-axis flux estimate value, subtracts the d-axis feedback current value from the d-axis command current value to generate a d-axis error current value, derives a d-axis regulated voltage value from the d-axis error current value and derives a d-axis command voltage value as a function of the d-axis regulated voltage value.

19. The apparatus of claim 18 wherein the machine is characterized by a pole count P and, wherein, the processor combines to provide the torque error value by evaluating the following equation:

$$T_{err} = \frac{3}{2} \cdot \frac{P}{2} \cdot \left[ -\frac{V_{qsreg} \cdot i_{qsfb}}{\omega_e} - \frac{V_{dsreg} \cdot i_{dsfb}}{\omega_e} \right]$$

where $V_{qsreg}$ is the q-axis regulated voltage value, $V_{dsreg}$ is the d-axis regulated voltage value, $i_{qsfb}$ is the q-axis feedback current value, $i_{dsfb}$ is the d-axis feedback current value and $\omega_e$ is the operating frequency.

20. The apparatus of claim 18 wherein the machine is characterized by a pole count P and a stator resistance value $r_s$, the processor further running software to derive d and q-axis reference flux values, the processor combining to provide the torque error value by evaluating the following equation:

$$T_{err} = \frac{3}{2} \cdot \frac{P}{2} \cdot \left[ \begin{array}{l} \left(\lambda_{dsref} - \frac{r_s \cdot i_{qsfb}}{\omega_e}\right) \cdot (i_{qs}^* - i_{qsfb}) - \frac{V_{qsreg} \cdot i_{qsfb}}{\omega_e} - \\ \left(\lambda_{qsref} - \frac{r_s \cdot i_{dsfb}}{\omega_e}\right) \cdot (i_{ds}^* - i_{dsfb}) - \frac{V_{dsreg} \cdot i_{dsfb}}{\omega_e} \end{array} \right]$$

where $\lambda_{dsref}$ corresponds to the d-axis reference flux value, $\lambda_{qsref}$ corresponds to the q-axis reference flux value, $i_{qsfb}$ corresponds to the q-axis feedback current value, $i_{dsfb}$ corresponds to the d-axis feedback current value, $i_{qs}^*$ corresponds to the q-axis command current value, $i_{ds}^*$ corresponds to the d-axis command current value, $V_{qsreg}$ corresponds to the q-axis regulated voltage value, $V_{dsreg}$ corresponds to the d-axis regulated voltage value and $\omega_e$ corresponds to the operating frequency.

* * * * *